Oct. 29, 1935.  A. J. MEYER ET AL  2,019,153
CLUTCH MECHANISM
Filed Feb. 4, 1931
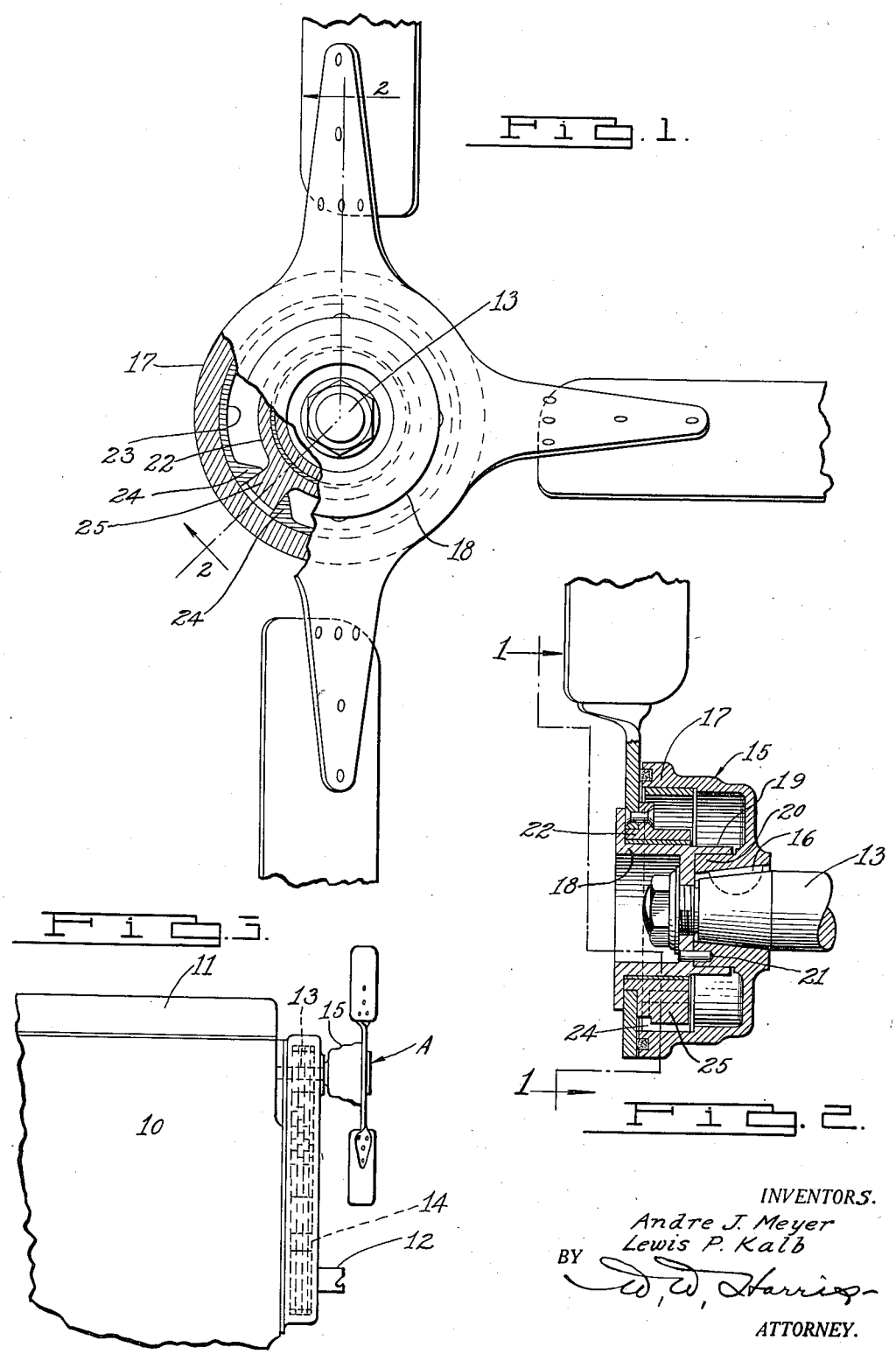
INVENTORS.
Andre J. Meyer
Lewis P. Kalb
BY
ATTORNEY.

Patented Oct. 29, 1935

2,019,153

UNITED STATES PATENT OFFICE 2,019,153

CLUTCH MECHANISM

Andre J. Meyer and Lewis P. Kalb, Detroit, Mich., assignors to Continental Motors Corporation, Detroit, Mich., a corporation of Virginia Application February 4, 1931, Serial No. 513,363

5 Claims. (Cl. 192—103)

This invention relates to internal combustion engines and more particularly to a fan structure and mounting cooperatively associated with said engine.

In engines provided with a fan, excessive loads are often applied to the fan driving mechanism when the engine is rapidly accelerated or decelerated and where such engines are provided with a flexible driving element for connecting the fan with the engine crankshaft or with other flexible drives, such as a timing chain such flexible drives are often broken or subjected to an excessive wear which materially shortens the life of the driving means.

An object of this invention is to provide a fan structure adapted for cooperative assembly with an internal combustion engine and constructed to slip when the speed of the engine is rapidly varied in order to prevent the breakage of such flexible driving means and reduce the wear on such parts which are cooperatively associated therewith.

A further object of this invention is to provide a fan mounting for cooperative assembly with an internal combustion engine including an intermediate driving intermediary adapted to provide a driving connection between the fan and a driving element operatively connected with the engine crankshaft, said driving intermediary being adapted for frictional engagement with said driving element and constructed to slip with respect to said driving element when the engine is rapidly accelerated or decelerated. A still further object of this invention is to provide a fan mounting including a driving intermediary associated with a fan element and a driving element adapted for operative connection with a crankshaft of an internal combustion engine, said driving intermediary fixed against relative rotation with respect to one of said elements and frictionally engaged with said other element, said driving intermediary being constructed and adapted for movement effecting an increased frictional engagement with the element frictionally engaged therewith in response to increased centrifugal forces generated by an increased engine speed thereby providing means carrying the increased torque loading resulting from an increased engine speed in order to provide the desired driving connection between said fan and said driving element associated therewith.

For a more detailed understanding of the invention, reference may be had to the accompanying drawing which illustrates one form which the invention may assume, and in which:

Figure 1 is an elevational view of a fan and mounting therefor constructed in accordance with my invention and showing in section a portion of the driving intermediary and associated elements, said section taken substantially on the line 1—1 of Figure 2, Figure 2 is a sectional view taken substantially on the line 2—2 of Figure 1, and Figure 3 is a fragmentary side elevational view of a portion of an internal combustion engine illustrating a driving connection between said fan and engine crankshaft.

In general an internal combustion engine comprises a cylinder block 10 to which may be suitably secured a cylinder head 11 and said block is constructed to support an engine crankshaft 12. A fan assembly A is associated with said engine and is preferably mounted upon a shaft 13 supported in suitable bearings (not shown) preferably carried by the engine block. Said shaft 13 is arranged to be driven by the engine crankshaft and is preferably connected therewith by means of a flexible driving element 14 which may consist of a continuous chain that may be adapted for also driving the timing mechanism of the engine if so desired.

The fan structure or assembly is mounted on this shaft 13 and preferably consists of a driving element 15 keyed or otherwise secured to said shaft as at 16 and this driving element is preferably provided with a drum 17. A fan support 18 is preferably secured to the driving element and as shown in the illustrated embodiment of the invention the support is provided with an annular inner extension 19 adapted for telescopic assembly with the hub 20 carried by the driving element, and said support is preferably pinned to the driving element by means of a pin 21. The fan is mounted on this fan support 18 and is preferably provided with a hub 22 adapted for engagement with the said support. It will be noted that the fan may rotate relatively to the support. A driving intermediary is interposed between the fan and driving element for connecting the fan with said driving element, and preferably this driving intermediary consists of a yieldable expansible shoe 23 or other suitable member which is fixed to the hub 22 against relative movement and is adapted for frictional engagement with the drum 17 of the driving element. Preferably the shoe 23 consists of a split ring or flexible band constructed of cast iron or other suitable material, said ring or band having enlarged portions 24 at each end which serve as abutments and which are preferably spaced apart to permit the assembly of a driving lug 25 carried by said fan hub 22. It will be noted that the driving lug 25 is positioned between the abutments 24 and thus when the driving element is rotated the flexible shoe or band 23 is rotated because of the frictional engagement between the shoe and drum 17 and the fan is thus rotated because of the driving connection between the shoe and the fan hub 22.

The flexible shoe or band 23 is expansible and as the speed of the driven element is increased the speed of the shoe is also increased thereby increasing the centrifugal forces acting upon said shoe, these centrifugal forces tending to flex or expand the shoe to increase the frictional engagement between the shoe and drum 17. Thus as the speed of the engine is increased the driving torque of the fan is increased and the increased frictional engagement between the shoe and drum 17 is sufficient to carry this increased driving torque for driving the fan at the same speed as the driving element connected with said engine crankshaft. This shoe 23 is constructed with an initial inherent tension to provide initial frictional engagement with the driving element at all times, the frictional engagement being gradually increased as the speed of the engine is gradually increased and thus the gradual acceleration of the engine will effect a gradual acceleration of the fan associated therewith.

The drive between the driving element and fan is adapted to slip when the engine is rapidly accelerated. This slippage between the fan and the driving element associated therewith results from the fact that the frictional engagement between the driving intermediary and the drum 17 is only sufficient to carry the torque resulting from a very gradual acceleration but the greatly increased torque resulting from the rapid acceleration of the engine is in excess of that which the frictional engagement between said driving intermediary and drum can carry. Thus as the driving element is rapidly accelerated, because of the rapid acceleration of the engine, the shoe or flexible band 23 will slip with respect to the drum but after the acceleration ceases the fan will gradually pick up speed until the same is rotating at the same speed as the driving element. Also when the engine is rapidly decelerated the quick variation in speed of the driving element is not transmitted directly to the fan but the inertia of the fan overcomes the frictional resistance and the fan is permitted to over-ride the driving element, the shoe slipping with respect to the drum 17. However, the drag between shoe and drum gradually reduces the speed of the fan on decelerating the engine until the fan again approximates the speed of the driving element.

It will thus be seen that the construction herein illustrated and described permits the fan to slip with respect to the driving element when the engine is rapidly accelerated or decelerated, but very little or no slippage occurs when the engine is very gradually accelerated or decelerated.

The advantage of this construction is that the slippage between the fan and driving element prevents the application of excessive loads on other cooperating parts of the engine, and in particular the flexible timing element which is employed for driving the timing mechanism and the driving element from the engine crankshaft. There is danger of breaking this chain when excessive loads are applied, due to rapid acceleration or deceleration of the engine. The slippage of the driving connection between the fan and driving element prevents the application of these excessive loads to these flexible driving mechanisms intermediate the fan driving element 15 and the engine crankshaft 12.

Although but one form of the invention has been illustrated and but a single application thereof has been described in detail, it will be apparent to those skilled in the art to which the invention pertains, that various modifications and changes may be made therein without departing from the spirit of the invention or from the scope of the appended claims.

What we claim as our invention is:

1. In a slipping clutch, a drive shaft, a hub secured to the drive shaft and having a drum portion, a support centered with said shaft and driven therewith, said support having a drum portion concentrically within said hub drum, a driven member having a hub mounted for rotation on said support drum portion, and a slipping driving element between said drum portions, said element being fixed to one drum portion and yieldingly engaged with said other drum portion, said element being deflected in response to variations in rotational speed thereof for varying the degree of yielding engagement of said element with said drum portion.

2. In a slipping clutch, a drive shaft, a hub secured to the drive shaft and having a drum, a support centered with said shaft and driven therewith, said support having a drum portion concentrically within said hub, a driven member having a hub loosely mounted on said support drum, and a friction band yieldingly engaging the drum of the drive shaft hub, said hub of the driven member having a lug adapted to drive said band, said band being deflected to yieldingly engage the drum of the drive shaft hub with a relatively greater force in response to increases in rotational speed of said band.

3. In a slipping clutch of the character described, a driving shaft, a driving structure fixed with said driving shaft, said structure having concentric inner and outer drums, a driven structure having a hub mounted on one of said drums, and a slipping driving element between said hub and the other of said drums, said element being deflected to effect a relatively more positive drive between said hub and said drum in response to a relative increase in rotational speed of said element.

4. In a slipping clutch of the character described, driving and driven members, driving and driven drum portions respectively carried by said driving and driven members, and a driving element fixed against relative rotation with one of said drum portions and yieldingly engaged with the other of said drum portions, said driving element comprising a yielding friction band concentrically disposed intermediate said drum portions and deflected in response to increased rotational speed thereof whereby to effect a relatively more positive drive between said drum portions.

5. In a slipping clutch of the character described, driving and driven members, a driving drum carried by said driving member, a driven drum concentrically supported within said driving drum and carried by said driven member, a driving element fixed against relative rotation with said driven drum and yieldingly engaged with said driving drum, said driving element comprising a yielding friction band concentrically disposed intermediate said driving and driven drum and radially expanded in response to increased rotational speed thereof whereby to effect a relatively more positive drive between said driving and driven drums.

ANDRE J. MEYER.
LEWIS P. KALB.